(12) United States Patent
Maiterth et al.

(10) Patent No.: US 7,892,034 B2
(45) Date of Patent: Feb. 22, 2011

(54) SMART CARD CONNECTOR COMPRISING LANDING CONTACTS AND A COVER SPRING AS A CARD STOPPER

(75) Inventors: Eduard Maiterth, Heilbronn (DE); Manfred Kerner, Erlenbach (DE)

(73) Assignee: Amphenol-Tuchel Electronics GmbH, Heilbronn (DE)

( * ) Notice: Subject to any disclaimer, the term of this patent is extended or adjusted under 35 U.S.C. 154(b) by 180 days.

(21) Appl. No.: 12/158,643

(22) PCT Filed: Dec. 21, 2006

(86) PCT No.: PCT/EP2006/012396

§ 371 (c)(1),
(2), (4) Date: Oct. 30, 2008

(87) PCT Pub. No.: WO2007/076959

PCT Pub. Date: Jul. 12, 2007

(65) Prior Publication Data

US 2009/0090778 A1        Apr. 9, 2009

(30) Foreign Application Priority Data

Dec. 22, 2005  (DE) ................ 10 2005 061 641

(51) Int. Cl.
*H01R 24/00*        (2006.01)
(52) U.S. Cl. .................... 439/630; 439/924.1
(58) Field of Classification Search ................ 439/267, 439/260, 630, 635; 235/441
See application file for complete search history.

(56) References Cited

U.S. PATENT DOCUMENTS

| | | | |
|---|---|---|---|
| 4,859,199 A | 8/1989 | Komatsu | |
| 5,269,707 A | 12/1993 | Reichardt et al. | |
| 5,369,259 A * | 11/1994 | Bleier et al. | ............... 235/441 |
| 6,015,311 A | 1/2000 | Benjamin et al. | |
| 6,102,723 A | 8/2000 | Kusakabe et al. | |
| 6,471,550 B2 | 10/2002 | Maiterth et al. | |

FOREIGN PATENT DOCUMENTS

| | | |
|---|---|---|
| DE | 3931508 A1 | 4/1991 |
| DE | 43 16 303 A1 | 11/1994 |
| DE | 10129580 A1 | 1/2003 |
| GB | 2198595 A | 6/1988 |

OTHER PUBLICATIONS

International Search Report, mailed Jul. 4, 2007.

* cited by examiner

*Primary Examiner*—Javaid Nasri
(74) *Attorney, Agent, or Firm*—Blank Rome LLP

(57) ABSTRACT

A smart card connector adapted to receive and place a smart card in a reading position is disclosed. The smart card connector comprises a contact support; a plurality of reading contacts attached to the contact support at a terminating end thereof, each of the reading contacts comprising a contact bulge for contacting a contact pad of the smart card and at least one control bulge for pivoting the contact bulge into contact with the contact pad of the smart card; a sliding element slidably mounted in the contact support so as to be movable between an initial position and an end position, the sliding element comprising a contact actuating member that engages the at least one control bulge as the sliding element moves toward the end position and presses the contact bulge against the contact pad of the smart card as the smart card reaches its reading position.

22 Claims, 11 Drawing Sheets

SMART CARD CONNECTOR COMPRISING LANDING CONTACTS AND A COVER SPRING AS A CARD STOPPER

This application is a National Phase of PCT/EP2006/012396 filed 21 Dec. 2006, which claims priority to DE 10 2005 061 641.0 filed 22 Dec. 2005, which is hereby incorporated by reference.

FIELD OF THE INVENTION

The present invention relates to a smart card connector having a contact support within which contact elements are arranged. Said contact elements will contact the contact pads of a smart card at the time the smart card (or chip card, in the following short "card") is inserted into the smart card connector.

BACKGROUND OF THE INVENTION

Smart card connectors with contact elements that contact the contact pads of a smart card at the time the smart card is inserted into the smart card connector are well known. By way of example., attention is drawn to the following documents:
  DE 101 29580
  DE 3931 508
  GB 2198 595

With such known smart card connectors, different problems occur. For example, if a smart card conector is frequently used, deteriorations of the contacts occur, a situation which has as a consequence, that the number of insert cycles is small. A further problem of smart card connectors of the known design is that if inserting the smart card into the smart card reader scratches will occur which are caused by the contact elements of the smart card connectors on the contact surfaces or contact pads of the smart card.

Inasmuch as the present invention relates in particular to the design of the reading contact elements, said reading contact elements will be referred to in the following description simply by "reading contacts".

It is noted, that known smart card connectors have relatively large dimensions and use a plurality of individual components like a card sled or reciprocally mounted card receiving space. Another problem with smart card connectors is the low safety against intrusions.

SUMMARY OF THE INVENTION

In accordance with the present invention a smart card connector is designed such, that the disadvantages of the prior art are avoided.

The invention provides a smart card connector adapted to receive and place a smart card in a reading position. The smart card reader comprises a card support and least one—preferably a plurality—of long reading contacts. Each of said reading contacts has a first end (mounting end) and a second end (free end). Each of said reading contact elements comprises for contacting a contact pad or contact zone of the smart card, a contact bulge and at least one control bulge for pivoting the reading contacts by means of a reciprocally mounted sliding element arranged in the contact support moveable between an initial position and an end position, such, that the contact bulges contact one contact pad of the smart card shortly before the reading position (card abutment) is reached. The sliding element preferably comprises contact element actuating surfaces formed by depressions which can be brought into engagement with control bulges, such, that the contact bulge (s) of the reading contact(s) are pressed against the contact pads shortly prior to reaching the reading position.

In the following the invention will be described referring to a reading contact. As it is clear to the skilled person, in general a plurality of reading contacts are provided in a smart card connector. A smart card connector is described referring to the drawing for an embodiment having six reading contacts.

Besides the reading contacts, the smart card connector is frequently equipped with other contact elements serving different purposes e.g. the smart card connector can be provided with a card presence switch or an end position switch.

In accordance with a design of the present invention the reading contacts are all mounted with their mounting ends in the contact support, preferably by pressing said reading contact elements into the contact support.

The sliding element is movably mounted in the contact support such, that the sliding element is slidably moved (by the card) preferably only approximately on the last two millimeters prior to the abutment of the card at the contact support. The sliding element by its sliding movement and by means of an inclined surface activates the control bulges of the reading contacts. In this process the sliding element is moved within the smart card connector to a degree that the control bulges of the contact element come into abutment on a planar (flat) abutment surface formed on the sliding element. At the time the reading contacts are placed with their control bulges on said flat abutment surface of the sliding element, the reading contacts do not develop an ejection component (movement), i.e. the reading contacts do not press the inserted smart card into the direction of ejection. In this condition, in which the control bulges are placed on the planar abutment surface of the sliding element, the contact bulges of the reading contacts contact the contact pads of the smart card.

In accordance with a preferred embodiment of the invention the smart card connector comprises a cover preferably in the form of a resilient metal cover. This resilient metal cover is placed on the upper surface of the contact support and is preferably mounted thereto by snap means. Because the cover for the contact support is designed as a resilient metal cover the tolerances of the card are of no significance in the contact situation.

Another advantage caused by the use of the resilient metal cover is that it can be designed to act as a card brake. Moreover, the resilient metal cover allows a flat design for the smart card reader.

Each of the reading contacts comprises at a first end and a second end. The first end is a termination or mounting end or section. The second or free end is a contact section or contact end. The termination section in turn comprises a mounting section for anchoring the contact end at the contact support and further, protecting therefrom, a termination tongue. The termination sections of preferably all reading contacts are fixedly mounted at the contact support by means of the connecting sections and they are preferably pressed into the contact support. The second ends or contact ends of preferably all reading contacts project outwardly. In this manner, all reading contact terminations, i.e. the termination tongues of the reading contacts are arranged opposite to the card insert slot side.

So as to make it possible to safely press the reading contacts into the contact support, the reading contacts are provided preferably in their mounting sections with harpoon-like projections.

Because the metal cover abuts in a resilient condition onto the upper surface of the contact support, the metal cover will act as a brake at the time the smart card is inserted. This breaking effect makes it impossible that the smart card is ejected out of the smart card connector by means of the reset springs of the sliding element. Alternatively, the metal cover can be biased or moved by its resiliency towards the card support surfaces such, that the metal cover is spaced from the card abutment or support surfaces by a distance which is smaller than the thickness of the card.

The invention provides a smart card connector which features reading contacts which will land on the contact surfaces of the smart card without creating an ejection component. Preferably, the metal cover serves as card brake and causes a reduction of tolerances or a balance of tolerance.

BRIEF DESCRIPTION OF THE DRAWINGS

Further advantages, objects and details of the invention can be gathered from the description of an embodiment which is shown in the drawing.

DETAILED DESCRIPTION OF THE PREFERRED EMBODIMENTS

Figure 1:
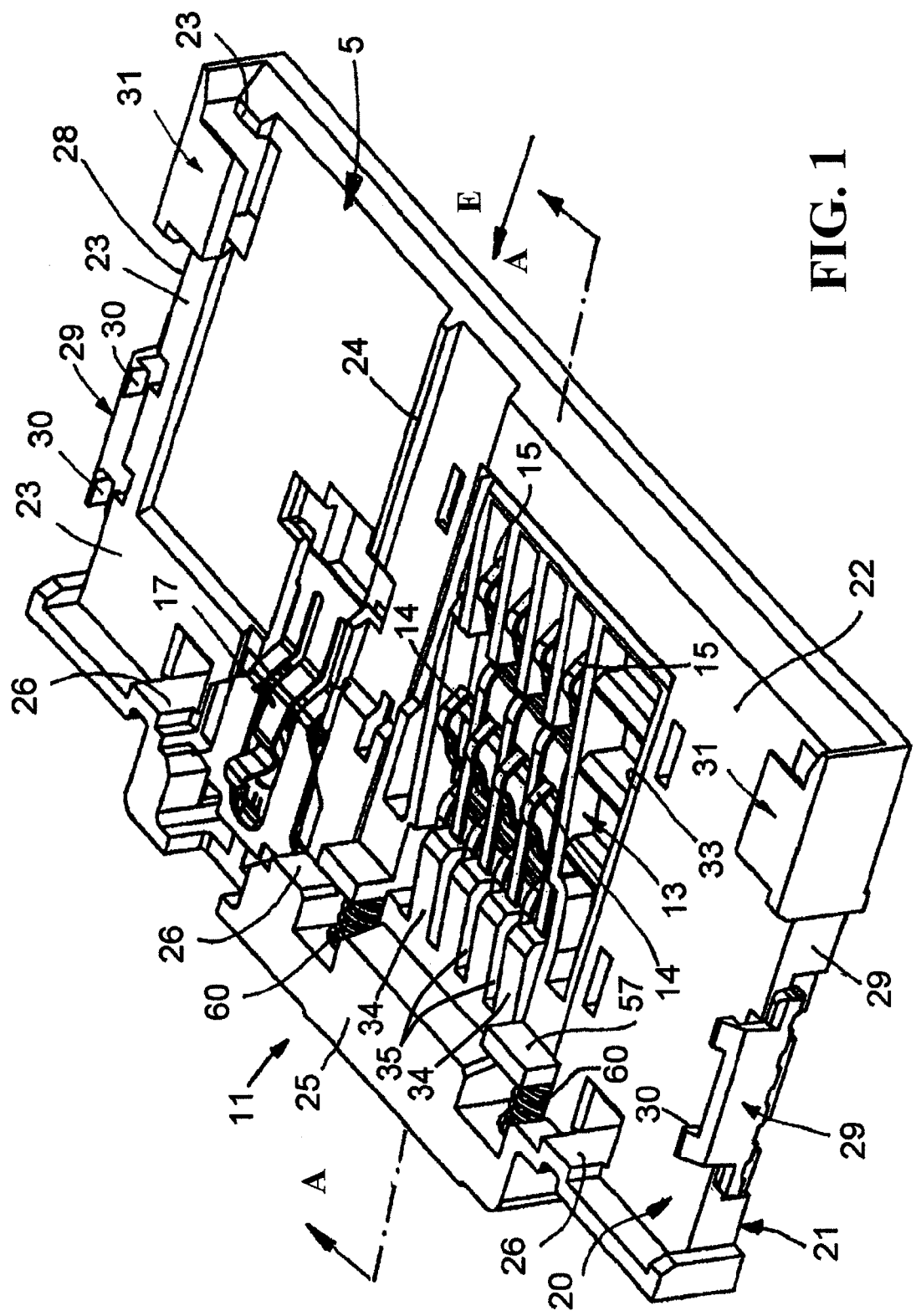
FIG. 1 is a perspective top plan view of the upper surface of a contact support of a smart card connector shown in its entirety in FIG. 6.
Figure 2:
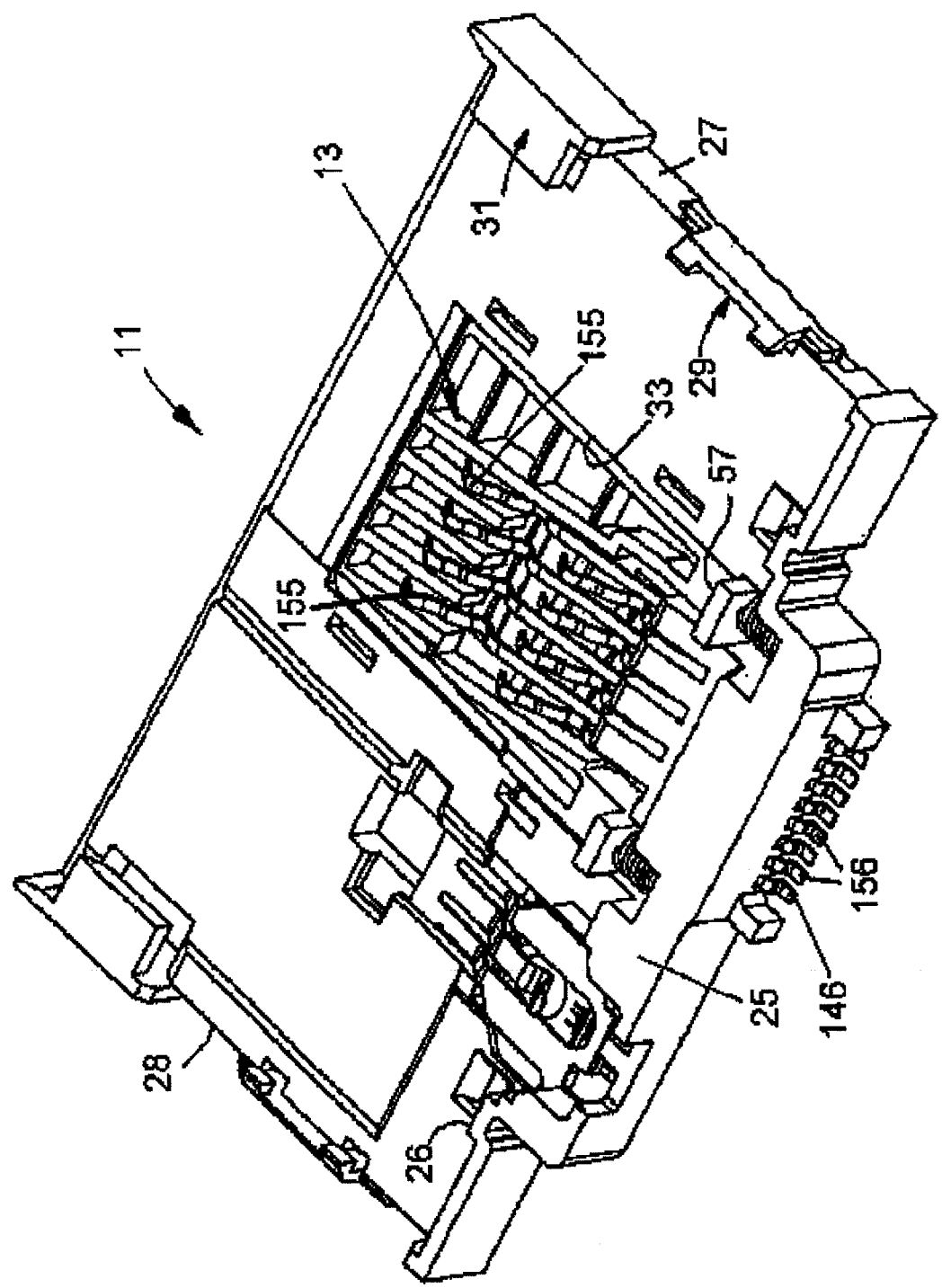
FIG. 2 is a perspective top plan view of the contact support of FIG. 1 seen from a different direction.
Figure 3:
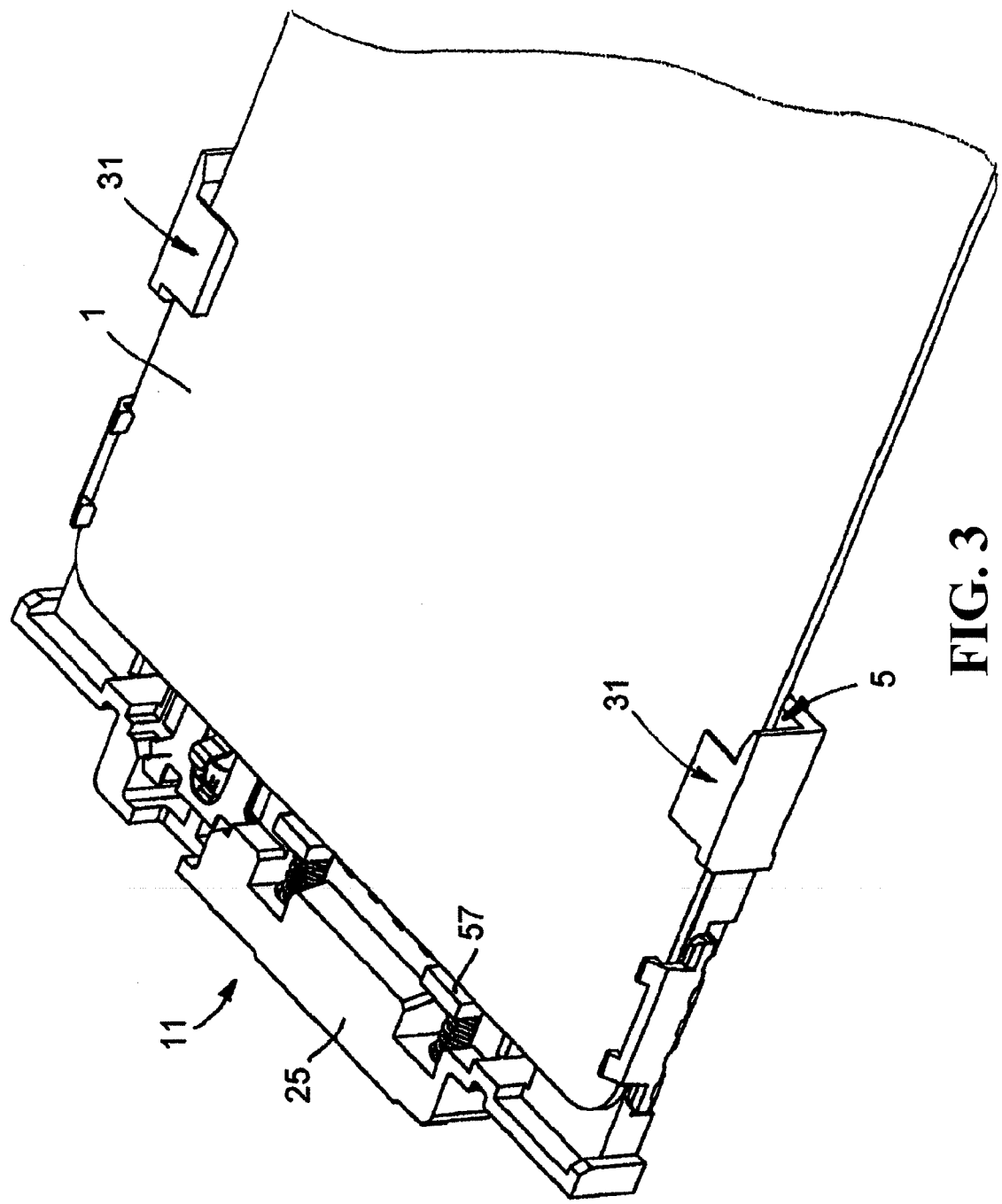
FIG. 3 the top plan view of the contact support with the smart card being inserted but not having reached its reading position and also without the use of a cover as is shown in FIG. 6.
Figure 4:
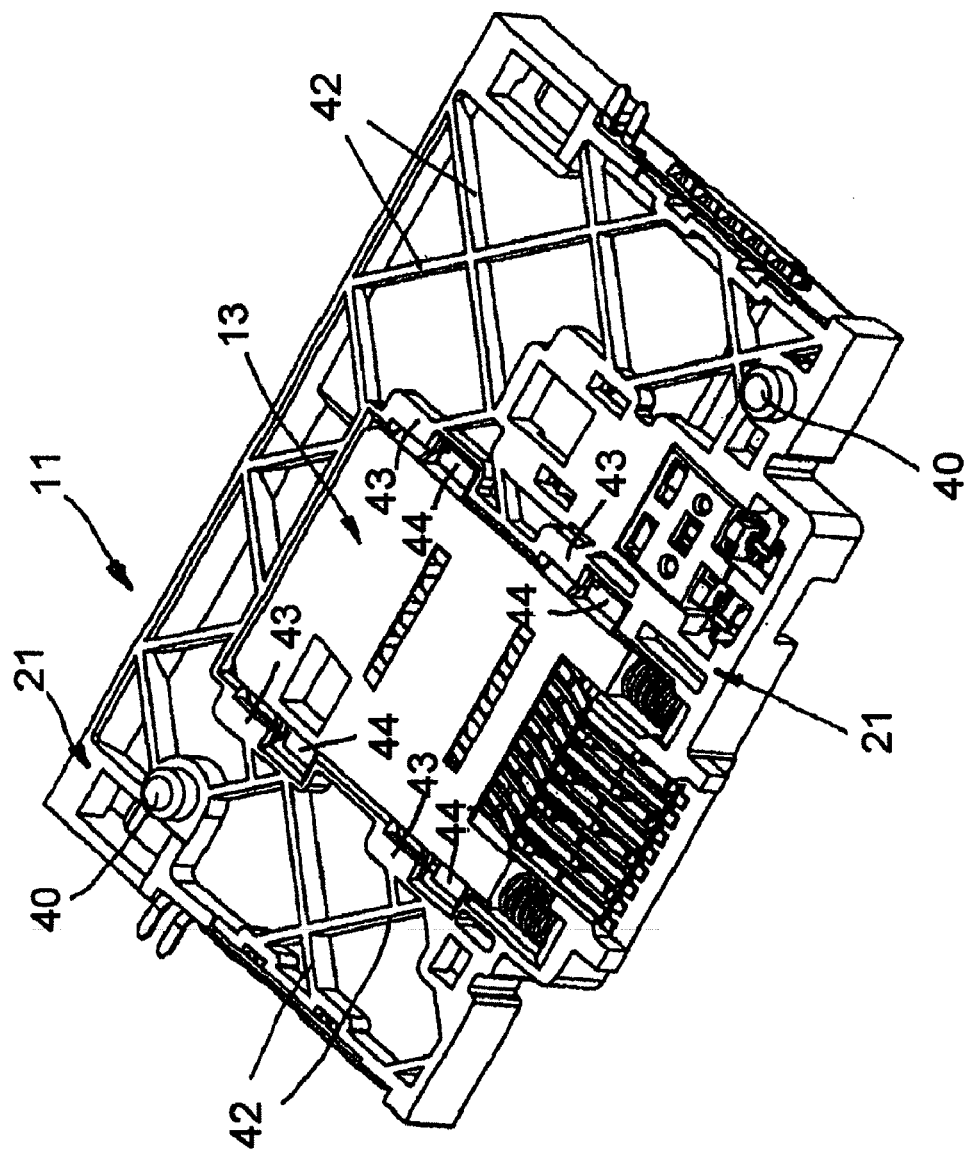
FIG. 4 is a perspective top plan view of the bottom side of the contact support as is shown in FIGS. 1 and 2.
Figure 6:
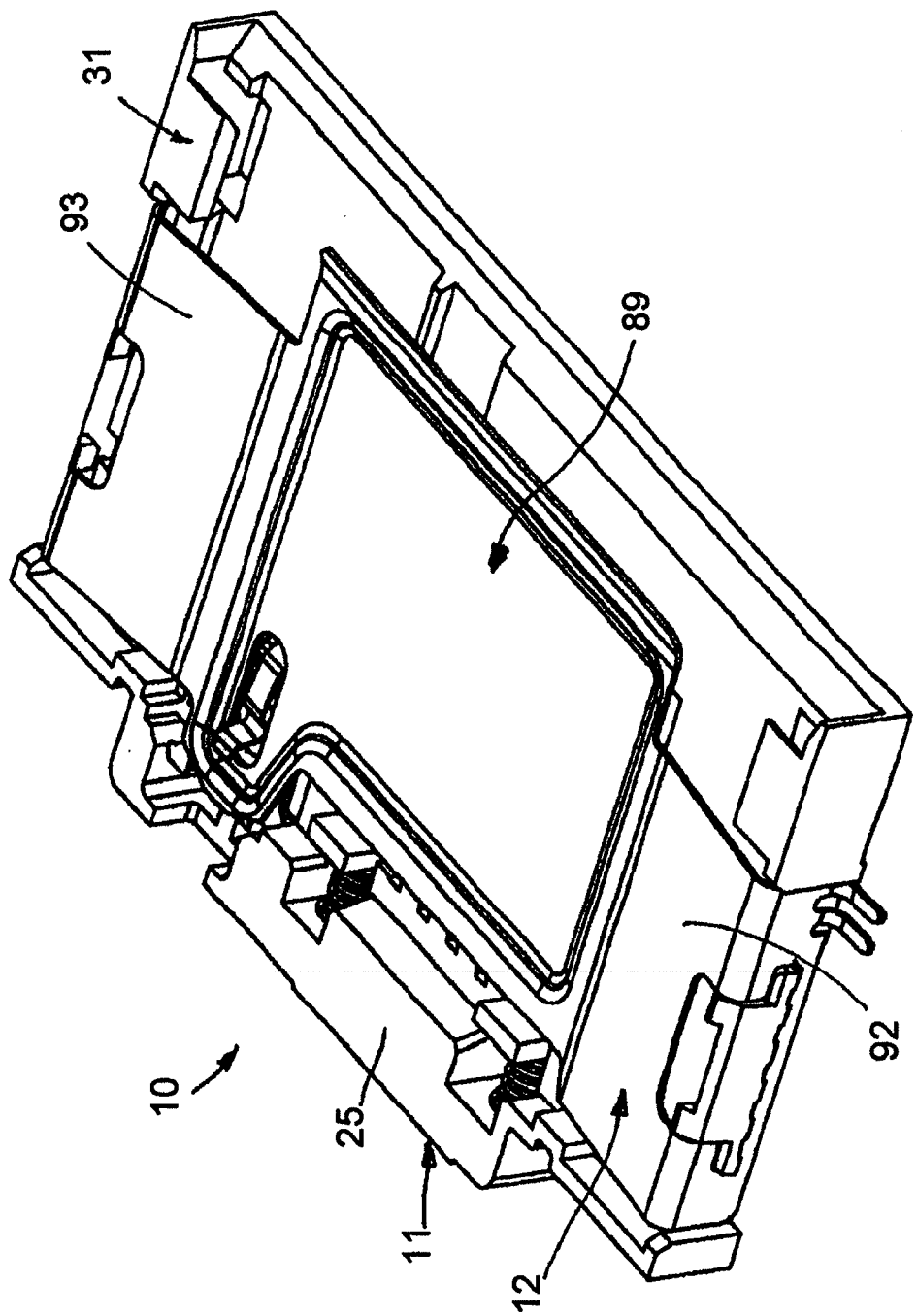
FIG. 6 is a top plan view of the smart card reader showing the metal cover mounted on the upper surface thereof

In particular FIGS. 1, 2 and 4 disclose a contact support or insulating body 11 designed in accordance with the invention, Together with a cover 12 shown in FIG. 6 the contact support 11 preferably forms the smart card connector 10 as shown in FIG. 6.

Figure 5:
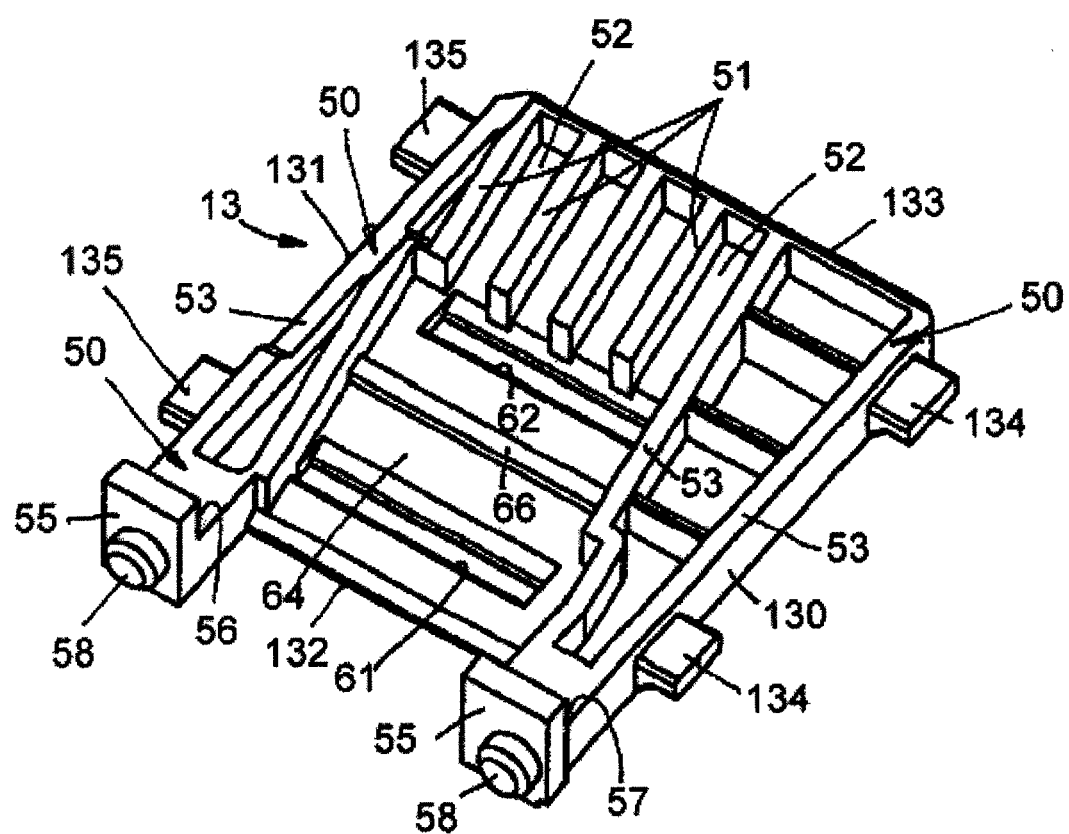
FIG. 5 is a perspective top plan view onto a sliding element as it is shown in FIGS. 1, 2 and 4, a sliding element which is reciprocally mounted in the contact support.

A sliding element 13 as shown in detail in FIG. 5 is reciprocally mounted within the contact support 11. In the contact support 11 reading contact elements 14, are mounted. In the following, the reading contact elements will be called reading contacts 14, 15. A group of short reading contacts 14 and a group of long reading contacts 15 is provided.

Moreover, an end position switch 17 is provided in the contact support 11. The end position switch 17 is activated by the smart card when it reaches its reading position. The smart card will be referred to below simply as the "card".

The Contact Support 11:

The contact support 11 comprises an upper surface shown in FIGS. 1 and 2 and a bottom surface 21 shown in FIG. 4. The upper surface forms an bottom and/or support surface 22 and further support surface 23 as well as a support surface 24. At the rear end—seen in the direction of insertion of the card—of the contact support 11 an end wall 25 is formed perpendicularly projecting with respect to the support surfaces 22, 23, 24. Said end wall 25 defines a plurality of card abutment surfaces 26 defining the reading position of the card 1.

At both sides 27, 28 of the contact support 1, sides 27, 28 which project contrary to the direction of insertion, each one clamping and card guiding arm (or guiding nose) 29 is provided preferably formed integrally with the contact support 11. On both sides, adjacent to an insert slot 5 for the card 1, a preferably U-shaped guide wall 31 is provided at the contact support 11.

In the area of the support surface 22 the contact support 11 forms an opening 33, adapted to receive a sliding element (13).

Further, guiding noses 34 project from the wall 25 in a direction contrary to the direction of insertion E and form guiding slots 35 for the short reading contacts 14.

As can be recognized in FIG. 4 at the bottom side 21 of the contact support 11 mounting posts 40 are formed. Moreover, reinforcement ribs 42 are provided to reduce the weight of the contact support 11. In the area of the receiving opening 33 of the sliding element, sliding element guiding means 43 are formed adjacent to the longitudinal sides 130, 131 of the sliding element 13. The sliding element guiding means 43 are accessible via adjacent insert openings 44 so as to allow the insertion of four sliding element ribs 134, 135 of the sliding element 13 into the contact support 11.

The Sliding Element 13:

The sliding element 13 shown in FIG. 5 defines support surfaces 50 for an inserted smart card 1. The sliding element 13 comprises, as was mentioned, two spaced longitudinal sides 130 and 131 as well as two transversal sides 132, 133 extending in a transversal direction to the longitudinal sides. At the longitudinal side 130 preferably two sliding element ribs 134 are formed and at the longitudinal side 131, two sliding element ribs 135 are formed with a spacing in between. Guide ribs 51 project from the transversal side 133 in longitudinal direction towards the transversal side (132). The guide ribs 51 end prior to a second recess 62 yet to be described. The guide ribs 51 form guide chambers 52 for the long reading contacts 15. Moreover, ribs 53 are formed which form e.g. the side wall 130, 131 and guarantee the stability of the sliding element 13.

At the transversal side 132, angled means 55 are provided which project with respect to the transversal side 132 and are located adjacent to the respective ends of the longitudinal sides 130, 131. Each one of the angled means 55 comprises an abutment surface 56 and 57 respectively for the smart card 1. Spring receiving projections 58 project from the angled means 55 in the cart insert direction E. Reset springs 60, not shown if FIG. 5 but shown in FIG. 1 are supported by the angled means 55 and abut against the contact support 11. The reset springs 60 are preferably coil springs. The reset springs 60 are preferably supported in the card reader 1 only on one side. Preferably two coil springs 60 are provided with a distance in between. The reset coil springs 60 allow a simple assembly. A transversal rib 66 extends between a first transversally extending recess 61 and said second transversally extending recess 62.

Figure 9:
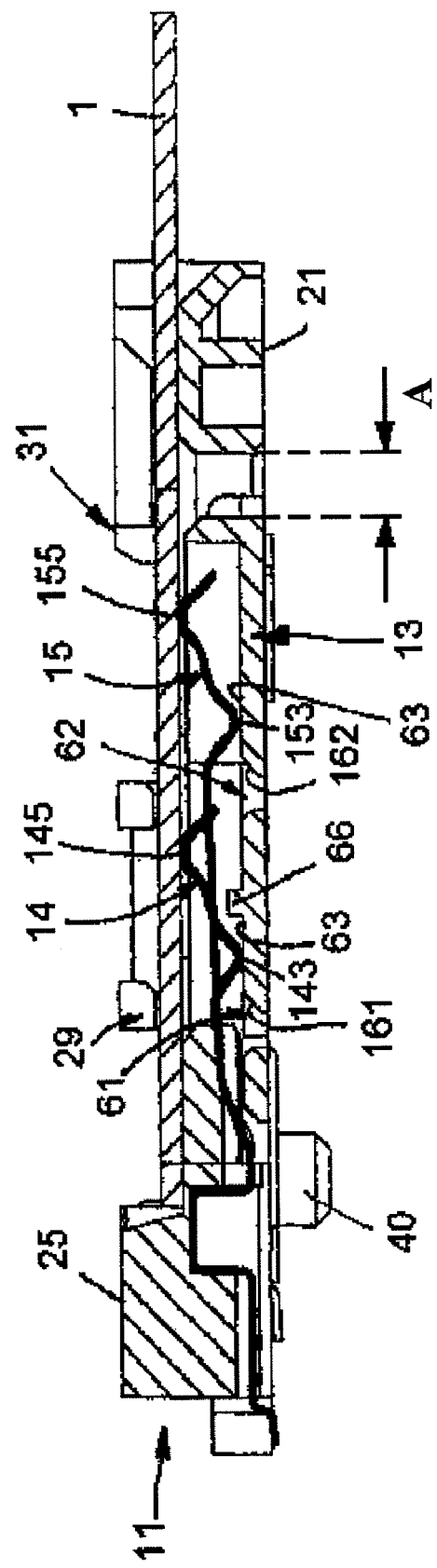
FIG. 9 is a sectional view similar to FIG. 8 showing the sliding element displaced by the distance A such that the contact elements i.e. the reading contacts are located with their control bulges on the abutment surfaces of the sliding element and with their contact bulges pressed against the contact zones of the smart card.

Adjacent to the recesses 61 and 62, respectively, contact support surfaces 63, 64—see FIG. 9—are provided. The contact support surface 63 will also be called the first contact support surface and serves for the abutment of the long contact elements 15. The contact support surface 64 is also referred to as the second contact support surface and serves as a support surface for the short reading contact 14.

Figure 7:
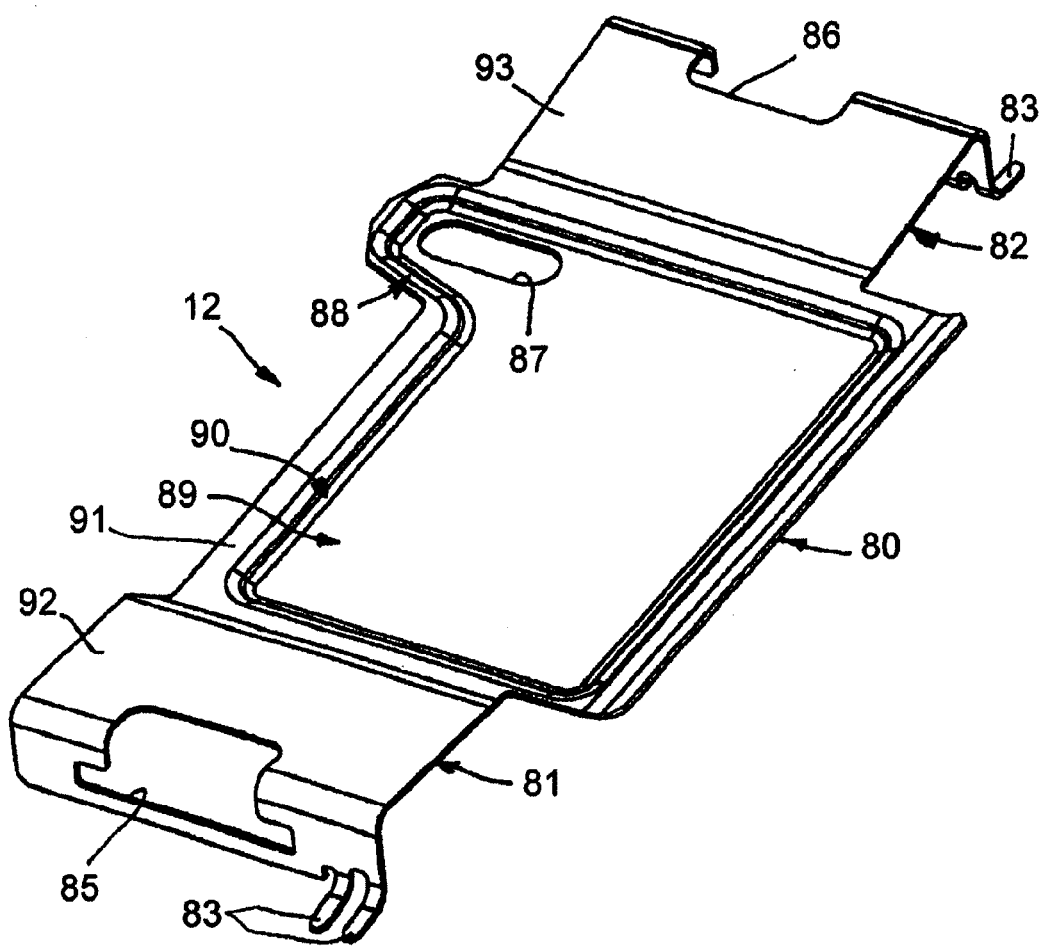
FIG. 7 is a perspective top plan view of a cover of the smart card connector, the cover being designed as a resilient metal cover.

Cover 12:

Cover 12 is shown in FIGS. 6 and 7, Cover 12 is preferably a cover made of metal, i.e. metal cover which is designed such, that it resiliently abuts at the contact support 11 with a bias. Therefore, the cover preferably made of metal can also be called a metal cover (cover with spring effect). Alternatively, the metal cover can be slightly spaced with respect to the support surfaces 22, 23 so as to provide for a card receiving space for the card 1. The resilient metal cover provides for a flat design of the smart card connector 10. The metal cover 12 comprises a center pressing portion 80 and adjacent thereto a first wing 81 and a second wing 82. At both wings 81, 82 electrical terminals 83 are provided. Further, each of said wings 81, 82 comprises a clamp recess 85, 86 for cooperating in conjunction with the clamp/guide arms 28 of the contact support 11. In a recess of the pressing portion 80 an opening 87 is provided. Moreover, the center pressing portion 80 forms a recess 89 which is formed by a stepped side wall 90. The upper surface of the center pressing portion 80 is referred to with the reference sign 91. Reference sign 92 refers to an upper surface of the wing 81 and reference sign 93 refers to an upper surface of the wing 82. As can be recognised, both wings 82 are bent upwardly with respect to the upper surface 91 of the center pressing portion so as to achieve said resilient spring effect. In this manner, the metal cover 21 can be placed on the contact support with a certain degree of resiliency (bias), with the clamp recesses 85, 86 being in engagement with the respective clamp/guide arms 29. Thus, in the embodiment as shown, the metal cover 12 is shown as a resilient metal cover which allows for a flat design of the smart card reader and which can also be used as a card brake. When the smart card is inserted the resilient metal cover 12 serves the purpose of pressing the smart card onto the contact support 11 such, that tolerances of the card have no relevance for the contact forces.

Figure 10:
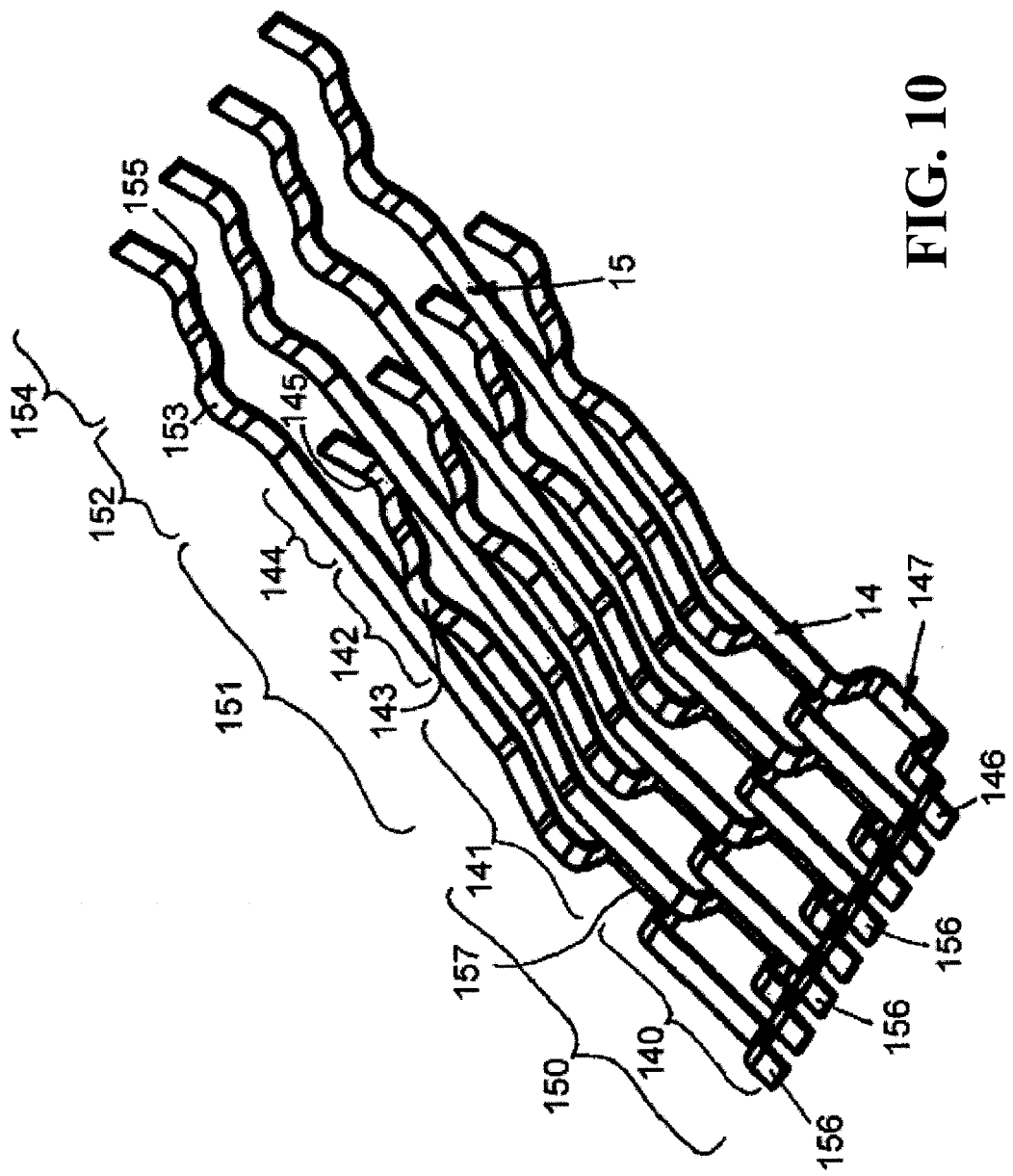
FIG. 10 is a perspective view of the reading contacts.

The Reading Contacts 64, 65:

FIG. 10 shows the short reading contacts 14 and the long reading contacts 15, in an arrangement with which they are mounted in the contact support 11. The short contact elements 14 each comprise a termination section 140, a spring section 141, a control section 142 with control bulges 143 and a contact section 144 with contact bulges 145.

Similarly, the long contacts 15 comprise a termination section 150, a spring section 151, a control section 152 and a control bulge 153 and a contact section 154 with contact bulge 155.

Figure 11:
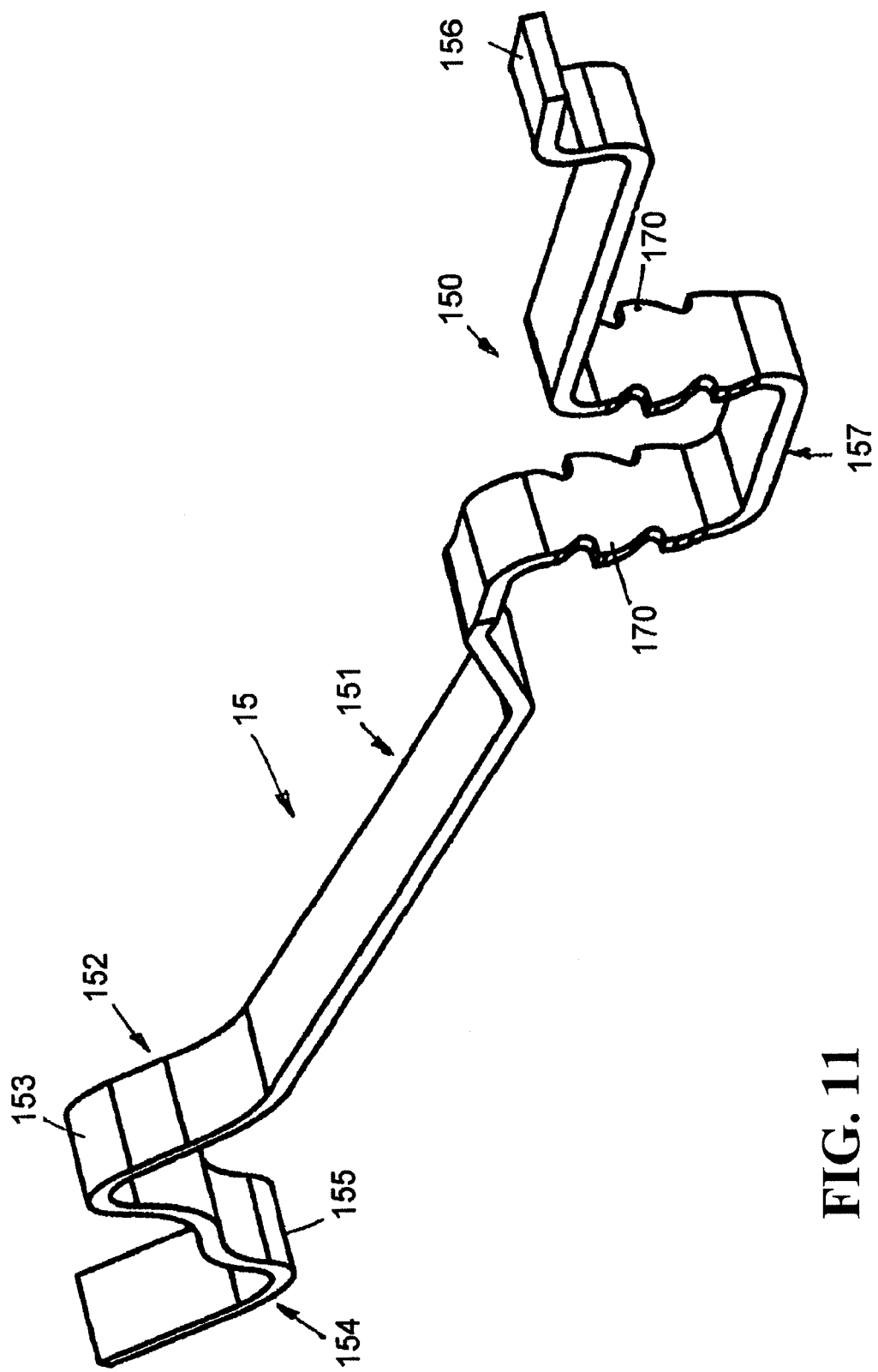
FIG. 11 is a perspective view of the reading contacts in particular showing the harpoon-like projections for mounting purposes in the contact support.

In FIG. 11 a long reading contact 15 is shown in detail.

The termination section 150 comprises, on the one hand, a termination tongue 156 projecting out of the smart card connector, it comprises on the other hand a mounting section 157 which is preferably bent to be U-shaped. Said mounting section 157 being provided with harpoon-like noses and mounting edges, respectively, so as to be adapted to be pressed into a respective recess (not shown) of the contact support 11.

Similarly, see FIG. 10, the termination sector 140 of the short reading contact 14 comprises a termination tongue 146 extending out of the smart card connector 10 and being preferably provided with a bent mounting section 147 with harpoon-like detent noses.

Preferably, the reading contacts 14, 15 are in the are of the spring sections, 141, 151 angled with respect to the termination section 140, 150 and thus extend in an inclined direction with respect to the reader 1 such, that the contact bulges 145, 155 are located adjacent to the reading contacts 14, 15, one behind the other on a line parallel to the direction of insertion E.

Figure 8:
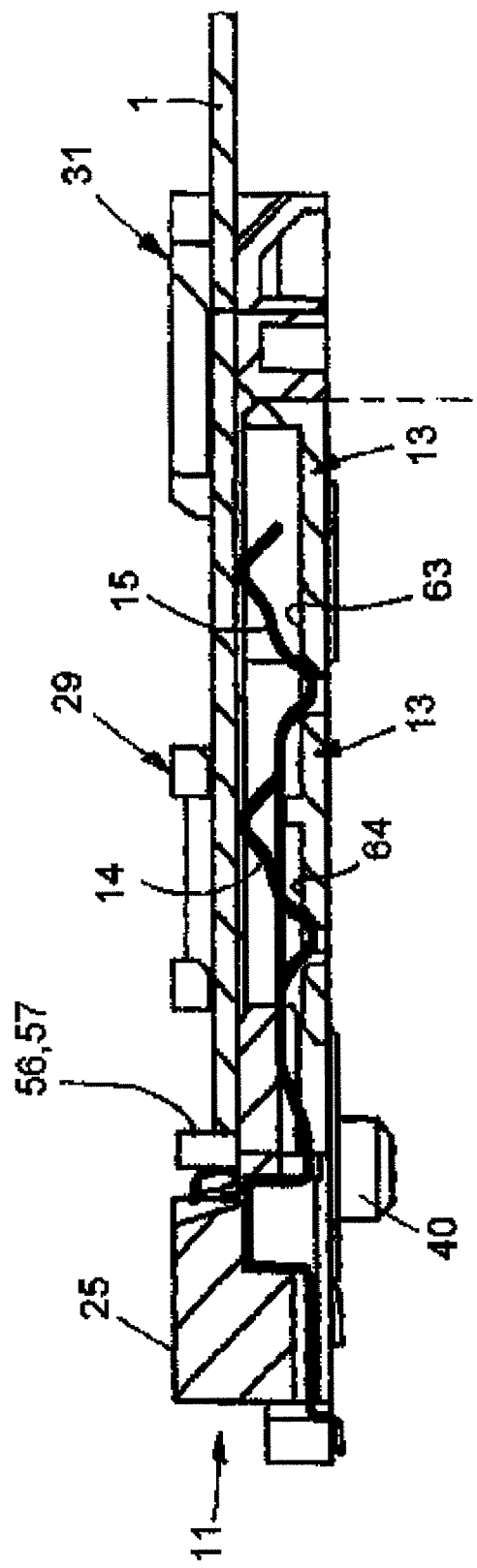
FIG. 8 is a sectional view along line A-A in FIG. 1 with the smart card being inserted into the contact support and being in abutment with the sliding element but with the sliding element not yet being moved into its abutment position which corresponds to the reading position of the card.

Referring to FIGS. 8 and 9 the operation of the smart card connector of the invention will be explained. For reasons of simplicity, the smart card connector shown in FIGS. 8 and 9 is shown without the metal cover 12.

In FIG. 8 the card is shown largely inserted in the direction of insertion E into the card reader and the card has already contact with the abutments 56, 57 of the sliding element causing a slight lift of the reading contacts 14, 16 in the direction of the contact surfaces (contact pads) of the card 1. One recognizes in FIG. 8, that the control bulges 143, 153 have moved onto the inclined surfaces formed by the recesses 61, 62 and the control bulges 143, 153 are thus slightly lifted.

In FIG. 9 card 1 is shown in its reading position. The front edge of the card 1 abuts at the abutment surfaces 26 of the contact body 11 and the sliding element is located in its end position with the front edge of the card 1 also being in abutment with the abutment surfaces 57 of the sliding element. In the condition shown in FIG. 9, the reading contacts 14, 15 are in contact engagement with the contact pads of the smart card 1, with the control bulges 143 and 53, respectively being placed on respective contact abutment surfaces 63, 64 of the sliding element 13 so as to apply a well defined contact pressing force at the contact pads of the card 1. The moving distance A (in FIG. 9) of the sliding element is preferably only a few millimeters, preferably this distance is for a smart card 1 of customary design about two millimeters.

| List of Elements | |
|---|---|
| 1 | Smart Card |
| 5 | Insert Slot |
| 10 | Smart Card Connector |
| 11 | Contact Support |
| 12 | Metal Cover |
| 13 | Sliding Element |
| 14 | Short Reading Contacts |
| 15 | Long Reading Contacts |
| 17 | End Position Switch |
| 20 | Upper Surface |
| 21 | Bottom Surface |
| 22 | Support Surface |
| 23 | Support Surface |
| 24 | Support Surface |
| 25 | End Wall |
| 26 | Card Abutment Surface |
| 27 | Side |
| 28 | Side |
| 29 | Clamping and Card Guiding Arm |
| 30 | Guide Surface |
| 31 | Guide Wall |
| 33 | Sliding element Receiving Opening |
| 34 | Guiding Nose |
| 35 | Guiding Slots |
| 40 | Posts |
| 41 | Guide Chambers |
| 42 | Reinforcement Ribs |
| 43 | Sliding element Guides |
| 44 | Insert Openings |
| 50 | Support Surface of the Sliding element |
| 51 | Guide Ribs |
| 52 | Guide Chamber |

-continued

List of Elements

| | |
|---|---|
| 53 | Ribs |
| 55 | Angled Means |
| 56 | Abutment Surface |
| 57 | Abutment Surface |
| 58 | Spring Receiving Projections |
| 60 | Springs |
| 61 | First Connection |
| 62 | Second Connection |
| 63 | First Contact Support Surface |
| 64 | Second Contact Support Surface |
| 66 | Transversal Rib |
| 80 | Center Pressing Portion |
| 81 | First Wing |
| 82 | Second Wing |
| 83 | Termination |
| 85 | Clamp Recess |
| 86 | Clamp Recess |
| 87 | Opening |
| 88 | Recess |
| 89 | Recess |
| 90 | Stepped Side Wall |
| 91 | Upper Surface of the Pressing Portion |
| 92 | Upper Side of the First Wing |
| 93 | Upper Side of the Second Wing |
| 130 | Longitudinal Sides |
| 131 | Longitudinal Sides |
| 132 | Transversal Sides |
| 133 | Transversal Sides |
| 134 | Sliding Element Rib |
| 135 | Sliding Element Rib |
| 140 | Termination Section |
| 141 | Spring Section |
| 142 | Control Section |
| 143 | Control Bulge |
| 144 | Contact Section |
| 145 | Contact Bulge |
| 146 | Termination Tongue |
| 147 | Mounting Section |
| 150 | Termination Section |
| 151 | Spring Section |
| 152 | Control Section |
| 153 | Control Bulge |
| 154 | Contact Section |
| 155 | Contact Bulge |
| 156 | Termination Tongue |
| 157 | Mounting Section |
| 161 | Inclined Surface |
| 162 | Inclined Surface |
| 170 | Noses and Mounting Edges |

What is claimed is:

1. A smart card connector adapted to receive and place a smart card in a reading position, said smart card connector comprising:
a contact support;
a plurality of reading contacts attached to the contact support at a terminating end thereof, each of said reading contacts comprising
a contact bulge for contacting a contact pad of the smart card, and
at least one control bulge for pivoting the contact bulge into contact with the contact pad of the smart card; and
a sliding element slidably mounted in said contact support so as to be movable between an initial position and an end position, said sliding element comprising a contact actuating member that engages the at least one control bulge as the sliding element moves toward the end position and presses the contact bulge against the contact pad of the smart card as the smart card reaches its reading position.

2. The smart card connector of claim 1, wherein said smart card, when it is inserted into the smart card connector, slidingly moves said sliding element only in the last millimeters before the smart card reaches its reading position.

3. The smart card connector of claim 2, wherein the last millimeters are 2 millimeters.

4. The smart card connector of claim 1, wherein said contact actuating member includes inclined surfaces formed on the sliding element.

5. The smart card connector of claim 4, wherein said inclined surfaces are formed by recesses.

6. The smart card connector of claim 1, wherein said contact actuating member comprises:
a first recess provided in the sliding element; and
a second recess provided in the sliding element spaced longitudinally from the first recess.

7. The smart card connector of claim 6, wherein said contact actuating member further comprises first and second contact support surfaces adjacent to the first and second recess on the sliding element that support the at least one control bulge and presses the contact bulge against the contact pad of the smart card.

8. The smart card connector of claim 7, wherein, the plurality of reading contacts include first reading contacts and second reading contacts alternately mounted to the contact support, the first reading contacts being shorter than the second reading contacts such that the contact bulges of the first reading contacts project different distances away from the contact support than the contact bulges of the second reading contacts.

9. The smart card connector of claim 8, wherein the sliding element comprises abutment surfaces of the that abut a front edge of the smart card when the smart card reaches its reading position.

10. The smart card connector of claim 1, wherein reset springs are provided as coil springs and are located in the contact support at one side thereof.

11. A smart card connector adapted to receive and place a smart card in a reading position, said smart card connector comprising:
a contact support;
first reading contacts and second reading contacts alternately attached to the contact support at terminating ends thereof, each of the first reading contacts and second reading contacts comprising a contact bulge for contacting a contact pad of the smart card and at least one control bulge for pivoting that reading contact into contact with the contact pad of the smart card, and each of the first reading contacts being shorter than each of the second reading contacts such that a distal end of each first reading contact projects a different distance away from the contact support than a distal end of each second reading contact;
a sliding element reciprocally slidably mounted in said contact support between an initial position and an end position, the sliding element being slidingly moved by the smart card when the smart card is inserted into the smart card connector and comprising
abutment surfaces for abutting a front edge of the smart card,
longitudinal sides, and
guide ribs which form guide chambers that extend inclined with respect to the longitudinal sides for guiding at least the of second reading contacts ;and
a contact actuating member that can be brought into engagement with the at least one control bulge such that the contact bulges of the first reading contacts and second reading contacts will contact corresponding contact pads of the smart card as the smart card reaches its reading position, the contact actuating member comprising
a first inclined surface formed on the sliding element by a first recess,
a second inclined surface formed on the sliding element by a second recess that is spaced longitudinally from the first inclined surface,
first and second contact support surfaces formed on the sliding element adjacent to the first and second recesses, respectively, and with which the first reading contacts and second reading contacts abut when the first reading contacts and second reading contacts are in contact with the corresponding contact pads of the smart card.

12. The smart card connector of claim 11, wherein the contact support comprises transversely spaced guide noses projecting away from a wall of the contact support and forming guide slots for guiding at least the of first reading contacts.

13. The smart card connector of claim 12, wherein the contact support further comprises an upper surface and a bottom surface and forms a sliding element receiving opening that extends between the upper surface and the bottom surface.

14. The smart card connector of claim 13, wherein a cover, is mounted on the upper surface of the contact support.

15. The smart card connector of claim 14, wherein the cover is a resilient metal cover.

16. The smart card connector of claim 15, wherein the metal cover is mounted at snap and card guide noses of the contact support.

17. The smart card connector of claim 16, wherein the first reading contacts and second reading contacts are pressed into the contact support at the terminating ends thereof.

18. The smart card connector of claim 17, wherein each of said first reading contacts and second reading contacts comprises a termination section at the terminating ends thereof, a spring section, a control section with the control bulge, and a contact section with the contact bulge.

19. The smart card connector of claim 18, wherein the termination section comprises a termination tongue and subsequent thereto a mounting section that is of a "U" shape and comprises detent teeth.

20. The smart card connector according to claim 19, wherein the mounting sections formed by the reading contacts are provided with harpoon-shaped noses.

21. The smart card connector according to claim 20, wherein the first reading contacts and second reading contacts are, in the area of the spring section, inclined with respect to the termination section so as to extend in an inclined direction in the smart card connector, and the contact bulges of adjacent reading contacts are located behind each other on a line parallel to a direction of insertion of the smart card.

22. The smart card connector as set forth in claim 21, wherein the first reading contacts and second reading contacts are lifted from below an insert plane when the smart card is inserted into the smart card connector, said insert plane being defined by a surface of the smart card connector that supports the smart card.

* * * * *

UNITED STATES PATENT AND TRADEMARK OFFICE
CERTIFICATE OF CORRECTION

PATENT NO. : 7,892,034 B2
APPLICATION NO. : 12/158643
DATED : February 22, 2011
INVENTOR(S) : Eduard Maiterth et al.

Page 1 of 1

It is certified that error appears in the above-identified patent and that said Letters Patent is hereby corrected as shown below:

In the Specification:

At column 1, line number 30, change "conector" to -- connector --

At column 3, line number 66, after "14," insert -- 15, --

At column 5, line number 33, change "recognised" to -- recognized --

At column 6, line number 4, change "in the are of" to -- in the area of --

At column 6, line number 18, change "16" to -- 15 --

At column 6, line number 30, change "and 53" to -- and 153 --

In the Claims:

At column 8, claim number 9, line number 30, delete the words "of the".

Signed and Sealed this
Sixth Day of September, 2011

David J. Kappos
*Director of the United States Patent and Trademark Office*